(12) United States Patent
Honda et al.

(10) Patent No.: US 9,482,389 B2
(45) Date of Patent: Nov. 1, 2016

(54) FUEL TANK PIPE STRUCTURE

(75) Inventors: Itsuo Honda, Kamakura (JP); Toshio Hattori, Sagamihara (JP)

(73) Assignee: NIFCO INC., Yokohama-Shi, Kanagawa (JP)

( * ) Notice: Subject to any disclaimer, the term of this patent is extended or adjusted under 35 U.S.C. 154(b) by 597 days.

(21) Appl. No.: 13/807,158

(22) PCT Filed: Jun. 14, 2011

(86) PCT No.: PCT/JP2011/003368
§ 371 (c)(1),
(2), (4) Date: Jan. 31, 2013

(87) PCT Pub. No.: WO2012/001894
PCT Pub. Date: Jan. 5, 2012

(65) Prior Publication Data
US 2013/0127159 A1    May 23, 2013

(30) Foreign Application Priority Data
Jun. 29, 2010   (JP) .................................. 2010-147216

(51) Int. Cl.
*F17C 13/00*  (2006.01)
*B60K 15/04*  (2006.01)
(Continued)

(52) U.S. Cl.
CPC ............... *F17C 13/00* (2013.01); *B60K 15/04* (2013.01); *F02M 37/0017* (2013.01);
(Continued)

(58) Field of Classification Search
CPC ..... F16L 41/086; F16L 37/26; F16L 37/098; F17C 13/00; F02M 37/0017; F02M 37/0076; B60K 15/04; B60K 2015/03467; B60K 2015/0346; B60K 2015/0461; B60K 2015/0477

USPC ........................................ 285/136.1; 137/511
See application file for complete search history.

(56) References Cited

U.S. PATENT DOCUMENTS 6,240,957 B1 *  6/2001  Hattori ........................ 137/527.6
7,404,498 B2    7/2008  Hattori et al.
(Continued)

FOREIGN PATENT DOCUMENTS

| CN | 1754713 A | 4/2006 |
|---|---|---|
| CN | 1827415 A | 9/2006 |

(Continued)

OTHER PUBLICATIONS

PCT, "International Search Report for PCT/JP2011/003368", Sep. 20, 2011.
(Continued)

*Primary Examiner* — Daniel P Stodola
*Assistant Examiner* — Zachary Dragicevich
(74) *Attorney, Agent, or Firm* — Manabu Kanesaka

(57) ABSTRACT

A fuel tank plumbing structure includes a first pipe; a second pipe coaxially connected to the first pipe; a flexible locking piece having a protruding end displaced in a radial direction of one of the first pipe or the second pipe; a locking portion formed in another of the first pipe or the second pipe to engage the locking piece; and a lock member annularly formed and fitted externally onto the one of the first pipe or the second pipe, and including an escape groove portion and a control wall portion arranged adjacent to the escape groove. The lock member is displaced in an axis line direction of the one of the first pipe or the second pipe between a first position wherein the locking piece is displaced toward the escape groove portion, and a second position wherein the locking piece abuts against the control wall portion.

6 Claims, 8 Drawing Sheets

(51) Int. Cl.
*F02M 37/00* (2006.01)
*F16L 37/098* (2006.01)
*B60K 15/03* (2006.01)

(52) U.S. Cl.
CPC ....... *F02M 37/0076* (2013.01); *F16L 37/098* (2013.01); *B60K 2015/0346* (2013.01); *B60K 2015/03467* (2013.01); *B60K 2015/0461* (2013.01); *B60K 2015/0477* (2013.01)

(56) References Cited

U.S. PATENT DOCUMENTS

2005/0051216 A1 3/2005 Sato
2007/0210607 A1* 9/2007 Murabayashi ... B60K 15/03519
296/97.22
2010/0126603 A1* 5/2010 Yamaguchi .................. 137/511
2011/0259447 A1* 10/2011 Ishizaka ....................... 137/511

FOREIGN PATENT DOCUMENTS

| | | |
|---|---|---|
| GB | 2327741 A | 2/1999 |
| JP | H10-082491 A | 3/1998 |
| JP | 3506034 B2 | 12/2003 |
| JP | 2004-136885 A | 5/2004 |
| JP | 3988671 B2 | 7/2007 |

OTHER PUBLICATIONS

China Patent Office, "Office Action for CN 201180040683.8," Jan. 13, 2015.

* cited by examiner

FUEL TANK PIPE STRUCTURE

FIELD OF TECHNOLOGY

The present invention relates to a fuel tank pipe structure, specifically, relates to a connection structure of a plumbing which is disposed inside a fuel tank.

BACKGROUND ART

In the fuel tank of a vehicle and the like, there is one wherein a through-hole is formed in an upper wall portion thereof and the like so as to be a fuel circulation opening by fixing a conduction pipe in a state inserted and passed through the through-hole. In an inner end positioned inside the fuel tank of the conduction pipe, there can be connected a filter device, a valve device, and the like (for example, Patent Document 1). In the invention according to the Patent Document 1, a connection pipe forming a casing of the valve device is fitted into the inner end of the conduction pipe, and a locking piece provided to protrude on an outer surface of the inner end of the conduction pipe, and a locking claw provided to protrude on an outer surface of the connection pipe are engaged so as to connect the conduction pipe and the connection pipe. Also, by an L-shaped holding piece provided to protrude on the outer surface of the connection pipe, the locking piece is clamped with respect to the outer surface of the connection pipe so as to make an engagement between the locking piece and the locking claw difficult to be released. However, in a case wherein the conduction pipe and the connection pipe are constructed of resin, the conduction pipe and the connection pipe respectively absorb a fuel and swell (deform), so that there has been a problem that a relative position between the holding piece and the outer surface of the connection pipe is displaced so as to be difficult to maintain an engagement state between the locking piece and the locking claw.

Relative to the above-mentioned problem, there is one wherein the locking piece is clamped with respect to the outer surface of the connection pipe using a ring member which is a separate body from the conduction pipe and the connection pipe (for example, Patent Document 2). The ring member is comparatively difficult to deform even if the ring member swells from a shape thereof so as to be capable of reliably maintaining the engagement state between the locking piece and the locking claw.

PRIOR ART DOCUMENTS

Patent Documents

Patent Document 1: Japanese Patent No. 3506034
Patent Document 2: Japanese Patent No. 3988671

SUMMARY OF THE INVENTION

Problems to be Solved by the Invention

The invention according to the Patent Document 2 however, the ring member is formed in the separate member from the conduction pipe or the connection pipe, and is assembled after the conduction pipe and the connection pipe are combined, so that there are problems that the number of components increases, and that a workload increases at an assembly time.

The present invention is made in view of the aforementioned problems, and an object is to provide a plumbing structure capable of reliably maintaining a connected state, and capable of easily carrying out an assembly work regarding the plumbing which is disposed inside the fuel tank.

Means for Solving the Problems

The present invention is a fuel tank plumbing structure (10) inserted into a through-hole (13) formed in a wall portion (12) of a fuel tank (11), and including a first pipe (15) attached to the fuel tank in such a way that while an inner end (23) is disposed inside the fuel tank, an outer end (24) is disposed outside the fuel tank; and a second pipe (16) coaxially connected to the inner end of the first pipe, and communicating into the first pipe. The fuel tank plumbing structure (10) includes a flexible locking piece (34) provided to protrude in one of either the first pipe or the second pipe, and wherein a protruding end thereof can be displaced in a radial direction of the first pipe or the second pipe; a locking portion (29) formed in the other of the first pipe or the second pipe, and locking the locking piece in a state wherein the first pipe and the second pipe are in communication; and a lock member (17) annularly formed, and externally fitted into an outer peripheral surface of the first pipe or the second pipe to be displaceable between a predetermined first position and a second position. In the state wherein the first pipe and the second pipe are in communication, in the first position, the lock member is separated from the locking piece, and allows an engagement and a disengagement of the locking piece and the locking portion. On the other hand, in the second position, the lock member abuts against the locking piece, and prevents the disengagement of the locking piece from the locking portion.

According to the structure, the lock member is supported in the first pipe or the second pipe beforehand, so that there is no need for mounting the lock member on the first pipe and the second pipe at an assembly work time of the first pipe and the second pipe, and an assembly workability is excellent.

Another aspect of the present invention is that in an inner peripheral surface of the lock member, there are formed an escape groove portion (53) facing the locking piece when the lock member is positioned in the first position; and a control wall portion (54) abutting against the locking piece when the lock member is positioned in the second position.

According to the structure, the lock member allows a displacement of the locking piece while externally surrounding the locking piece in the first position.

Another aspect of the present invention is that the lock member includes an elastic claw (48), and that at least either one of the first pipe or the second pipe includes an engagement portion (30) wherein the elastic claw engages when the lock member is positioned in the second position.

According to the structure, the lock member is held in the second position, and a connected state between the first pipe and the second pipe is maintained.

Another aspect of the present invention is that when the lock member is positioned in the first position, the elastic claw abuts against an end surface (65) of a pipe supporting the lock member inside the first pipe and the second pipe.

According to the structure, the elastic claw can combine a function defining the first position of the lock member.

Another aspect of the present invention is that one end portion of either the first pipe or the second pipe fits into the other end portion of the first pipe or the second pipe, and that the lock member is displaceable between the first position and the second position along an axis line direction of the first pipe or the second pipe wherein the lock member is externally fitted.

According to the structure, a connection direction between the first pipe and the second pipe, and a displacement direction of the lock member correspond so as to facilitate a connection operation.

Effect of the Invention

According to the aforementioned structure, a plumbing structure, wherein the connected state can be reliably maintained, and the assembly work can be easily carried out, can be provided.

BEST MODES OF CARRYING OUT THE INVENTION

Figure 1:
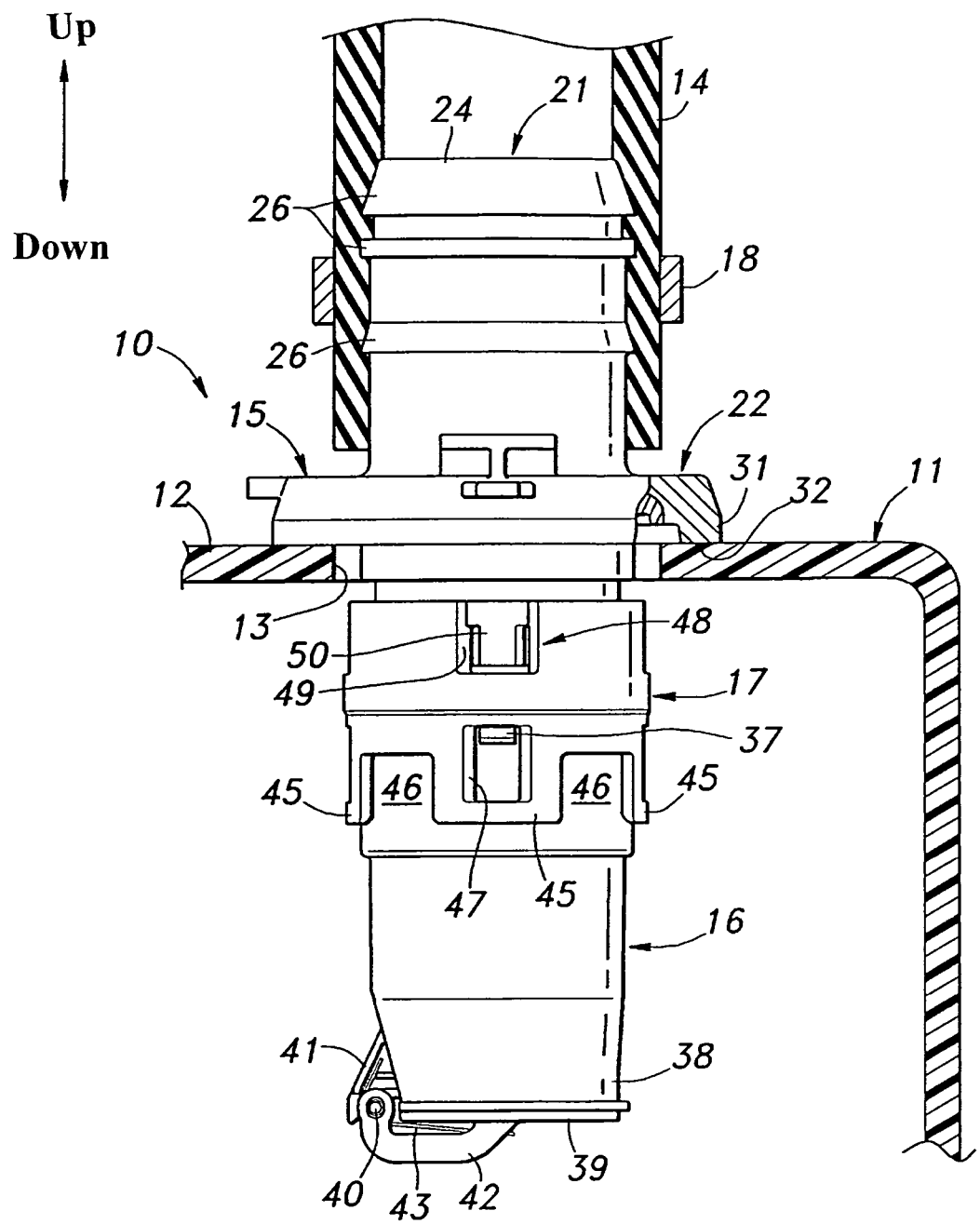
FIG. 1 is a partially exploded side view showing a state wherein a plumbing structure according to an embodiment is attached to a fuel tank and a fuel hose.

Hereinafter, with reference to drawings, one embodiment wherein a plumbing structure according to the present invention is applied to a fuel inflow opening of an automobile fuel tank will be explained in detail. As shown in FIG. 1, a plumbing structure 10 is joined to a peripheral edge portion of a through-hole 13 in a state inserted and passed through the through-hole 13 formed in an upper wall portion 12 of a fuel tank 11, and in an outer end thereof, there is connected a fuel hose 14. The following explanation will be explained using an up-and-down direction shown in FIG. 1 as a benchmark.

As shown in FIG. 1 to FIG. 4, in the plumbing structure 10, a conduction pipe (a first pipe) 15, a connection pipe (a second pipe) 16, and a lock member 17 are main constituent elements.

The conduction pipe 15 includes a cylindrical portion 21 whose both ends are open; and a discoid flange portion 22 provided to protrude outwardly in a radial direction from an outer peripheral surface of an intermediate portion in a longitudinal direction of the cylindrical portion 21. An end portion, which is one end of the cylindrical portion 21 on a side positioned inside the fuel tank 11 in a state wherein the conduction pipe 15 is attached to the fuel tank 11, is an inner end 23, and the other end is an outer end 24.

The conduction pipe 15 is formed by molding two colors of two types of resin materials which have different properties. The resin materials may be, for example, polyamide or polyethylene. The polyamide constitutes the cylindrical portion and a base portion of the flange portion 22, and the polyethylene constitutes an outer peripheral portion from the outer end 24 of the cylindrical portion 21 up to the flange portion 22, and a large part of the flange portion 22.

On an outer peripheral surface near the outer end 24 of the cylindrical portion 21, there is formed a plurality of annular protruding pieces 26 extending in a circumferential direction. As shown in FIG. 1, when a fuel hose 14 having a flexibility is mounted on the outer end 24 of the cylindrical portion 21, each protruding piece 26 bites into an inner surface of the fuel hose 14 so as to enhance an adhesion property and to act as a retention. Each protruding piece 26 may include an inclined surface whose protruding amount increases as it goes to an inner end 23 side from the outer end 24, and there may include a non-return surface in a portion on the inner end 23 side. Incidentally, as shown in FIG. 1, the fuel hose 14 may be fastened by a hose band 18 after being mounted on the outer end 24 of the cylindrical portion 21.

On an outer peripheral surface near the inner end 23 of the cylindrical portion 21, there is provided to be concaved an annular O-ring groove 27 extending in a circumferential direction. In the O-ring groove 27, there is mounted an O-ring 28 having a flexibility formed of, for example, rubber (see FIGS. 5 to 8).

In a portion which is an outer peripheral surface on the inner end 23 side of the cylindrical portion 21 between the O-ring groove 27 and the flange portion 22, there are provided to protrude four first locking claws (locking portions) 29, and four second locking claws (engagement portions) 30. The four first locking claws 29 are disposed with an interval of 90 degrees on the same circumference of the cylindrical portion 21. The four second locking claws 30 are disposed on a flange portion 22 side rather than a group of the first locking claws 29, and are disposed with an interval of 90 degrees on the same circumference respectively. Each second locking claw 30 is disposed out of alignment of 45 degrees around an axis line of the cylindrical portion 21 relative to an adjacent first locking claw 29. From a view in an axis line direction of the cylindrical portion 21, each first locking claw 29 and each second locking claw 30 are disposed in such a way as to be alternate. The first locking claw 29 and the second locking claw 30 respectively include a non-return surface facing the flange portion 22 side.

In a peripheral edge portion (a protruding end) of the flange portion 22, there is provided to extend an annular rib 31 protruding to the inner end 23 side along the peripheral edge portion thereof. The protruding end of the annular rib 31 becomes a bonded surface 32 which becomes vertical to the axis line of the cylindrical portion 21. As shown in FIG. 1, the bonded surface 32 is welded into the peripheral edge portion of the through-hole 13 of the upper wall portion 12 of the fuel tank 11, so that the plumbing structure 10 is joined to the fuel tank 11.

A connection pipe 16 is formed of resin materials such as, for example, polyacetal and the like, and is a cylindrical member whose both ends are open. A connection end 33 which is one end of the connection pipe 16 is formed in an inner diameter wherein the inner end 23 of the cylindrical portion 21 can be fitted in. In an end surface 65 of the connection end 33 of the connection pipe 16, there are formed four thin-piece-like locking pieces 34 protruding in parallel to an axis line of the connection pipe 16. Each locking piece 34 is formed with an interval of 90 degrees around the axis line of the connection pipe 16, and a void 35 is formed between adjacent locking pieces 34. Each locking piece 34 is formed in the same wall thickness as a wall thickness of the connection pipe 16 from a view in an axis line direction of the connection pipe 16, and is formed in such a way as to be curved along an outer peripheral surface and an inner peripheral surface of the connection pipe 16. Also, in each locking piece 34, there is formed a locking hole 36 passing through in a radial direction of the connection pipe 16. Each locking piece 34 is formed in a thin piece shape so as to have a predetermined flexibility, and by an elastic deformation, the locking piece 34 can slightly tilt in the radial direction of the connection pipe 16.

On an outer peripheral surface near the connection end 33 of the connection pipe 16, there are provided to protrude four guide convex portions 37. The four guide convex portions 37 are disposed with an interval of 90 degrees on the same circumference of the connection pipe 16, and are disposed in a portion respectively corresponding to the void 35 in the axis line direction (the up-and-down direction) of the connection pipe 16. The guide convex portion 37 has a cross-sectional surface formed in a rectangular triangle shape, includes an inclined surface in a portion on a connection end 33 side, and includes a control surface approximately orthogonal to an outer peripheral surface in a portion on an opposite side. Also, the guide convex portion 37 includes a lateral end surface approximately orthogonal to the outer peripheral surface of the connection pipe 16 on both ends in a circumferential direction.

An open end 38 which is an end portion on the opposite side of the connection end 33 of the connection pipe 16 is blocked by a flap plate 39 openably and closably. On an outer peripheral portion of the open end 38 of the connection pipe 16, there is provided to protrude a pedestal 41 comprising a support axis 40 extending in a tangential direction of the connection pipe 16. The flap plate 39 comprises two arm portions 42, and is rotatably pivoted on the support axis 40 in an end of each arm portion 42. In the support axis 40, there is supported a coil portion of a torsion coil spring 43. In the torsion coil spring 43, while one end thereof abuts against the outer peripheral surface of the connection pipe 16, the other end abuts against the flap plate 39, and the torsion coil spring 43 urges in a direction wherein the flap plate 39 abuts against an end surface of the open end 38. Thereby, only in a case wherein a fuel fluid (liquid or gas) passes through the open end 38 from an inside of the connection pipe 16, the flap plate 39 is open so as to prevent a back-flow which attempts to pass through the open end 38 from an outside of the connection pipe 16 of the fuel fluid.

Figure 2:
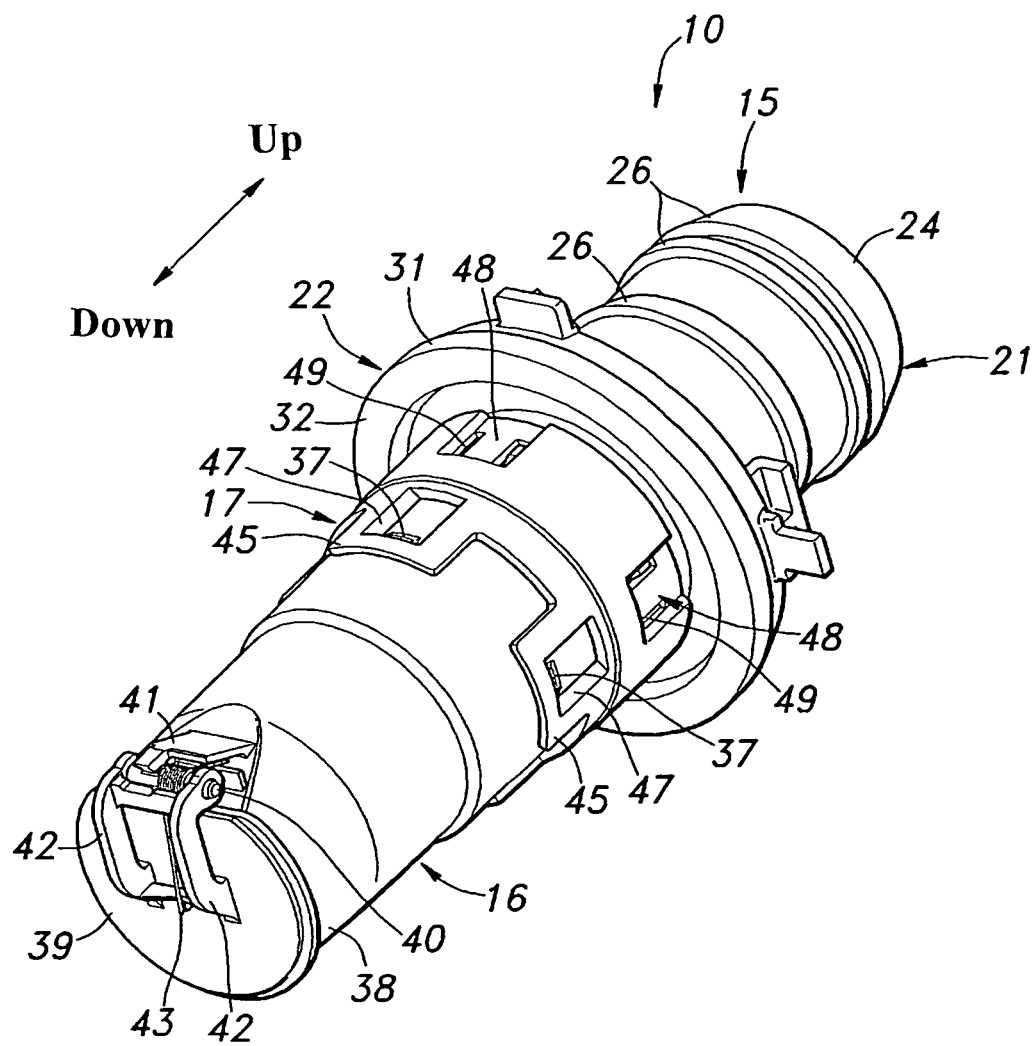
FIG. 2 is a perspective view of the plumbing structure according to the embodiment.
Figure 3:
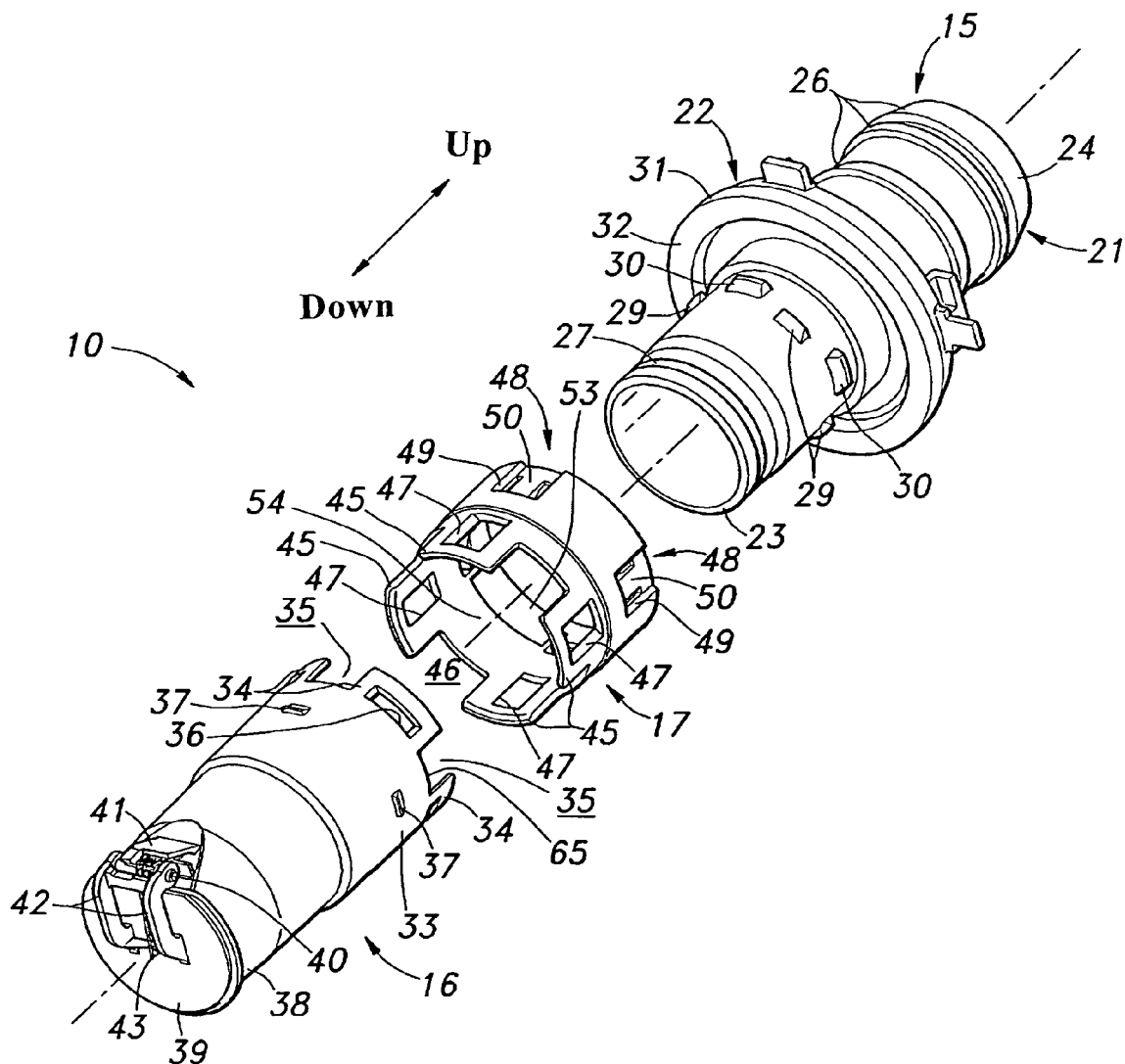
FIG. 3 is an exploded perspective view of the plumbing structure according to the embodiment.
Figure 4:
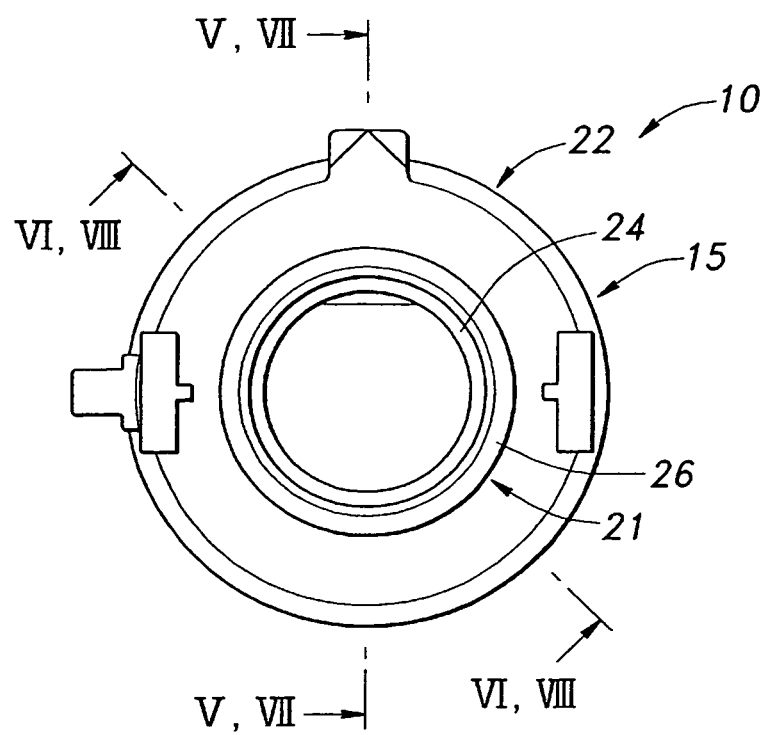
FIG. 4 is a side view of the plumbing structure according to the embodiment viewed from an axis line direction.

As shown in FIG. 2, the lock member 17 is a cylindrical member whose both ends (upper and lower ends) are open, and is formed in a size wherein the connection end 33 of the connection pipe 16 can be fitted into an inside thereof. The lock member 17 is formed of resin materials such as, for example, polyacetal and the like.

On a lower end surface of the lock member 17, there are formed four thin piece portions 45 protruding in parallel to an axis line of the lock member 17. Each thin piece portion 45 is formed with an interval of 90 degrees around the axis line of the lock member 17, and a void 46 is formed between adjacent thin piece portions 45. Each thin piece portion 45 is formed in the same wall thickness as a wall thickness of the lock member 17 from a view in an axis line direction of the lock member 17, and is formed in such a way as to be curved along an outer peripheral surface and an inner peripheral surface of the lock member 17. Each thin piece portion 45 is formed in a thin piece shape so as to have a predetermined flexibility, and by an elastic deformation, the thin piece portion 45 can slightly tilt in the radial direction of the connection pipe 16. From a central portion of each thin piece portion 45 to a lower end portion of the lock member 17, there are formed guide holes 47 passing through in a radial direction of the lock member 17. The guide hole 47 has a rectangular shape extending in the axis line direction of the lock member 17, and while a short side thereof is formed in a length wherein the guide convex portion 37 can be fitted in, a long side thereof is formed sufficiently longer than the guide convex portion 37.

In an upper half portion of the lock member 17, four elastic claws 48 are provided with an interval of 90 degrees in the same circumference, and are positioned on an upper side of each guide hole 47. Each elastic claw 48 passes through from the inner peripheral surface to the outer peripheral surface of the lock member 17. Also, each elastic claw 48 includes a cantilever piece 50 cut out by a slot 49 having a C shape whose upper side is open from a view in the radial direction of the lock member 17; and a claw portion 51 provided to protrude to an inner side in the radial direction of the lock member 17 in an end portion of the cantilever piece 50 (see FIG. 1, FIG. 5 and FIG. 6). The claw portion 51 includes an inclined surface formed in such a way that a protruding amount increases as it goes to a lower side (an end side of the cantilever piece 50); and a non-return surface provided in a lower end of the inclined surface, and approximately orthogonal to the outer peripheral surface. From a view in the axis line direction of the lock member 17, the claw portion 51 protrudes to the inner side more than the inner peripheral surface of the lock member 17.

Figure 6:
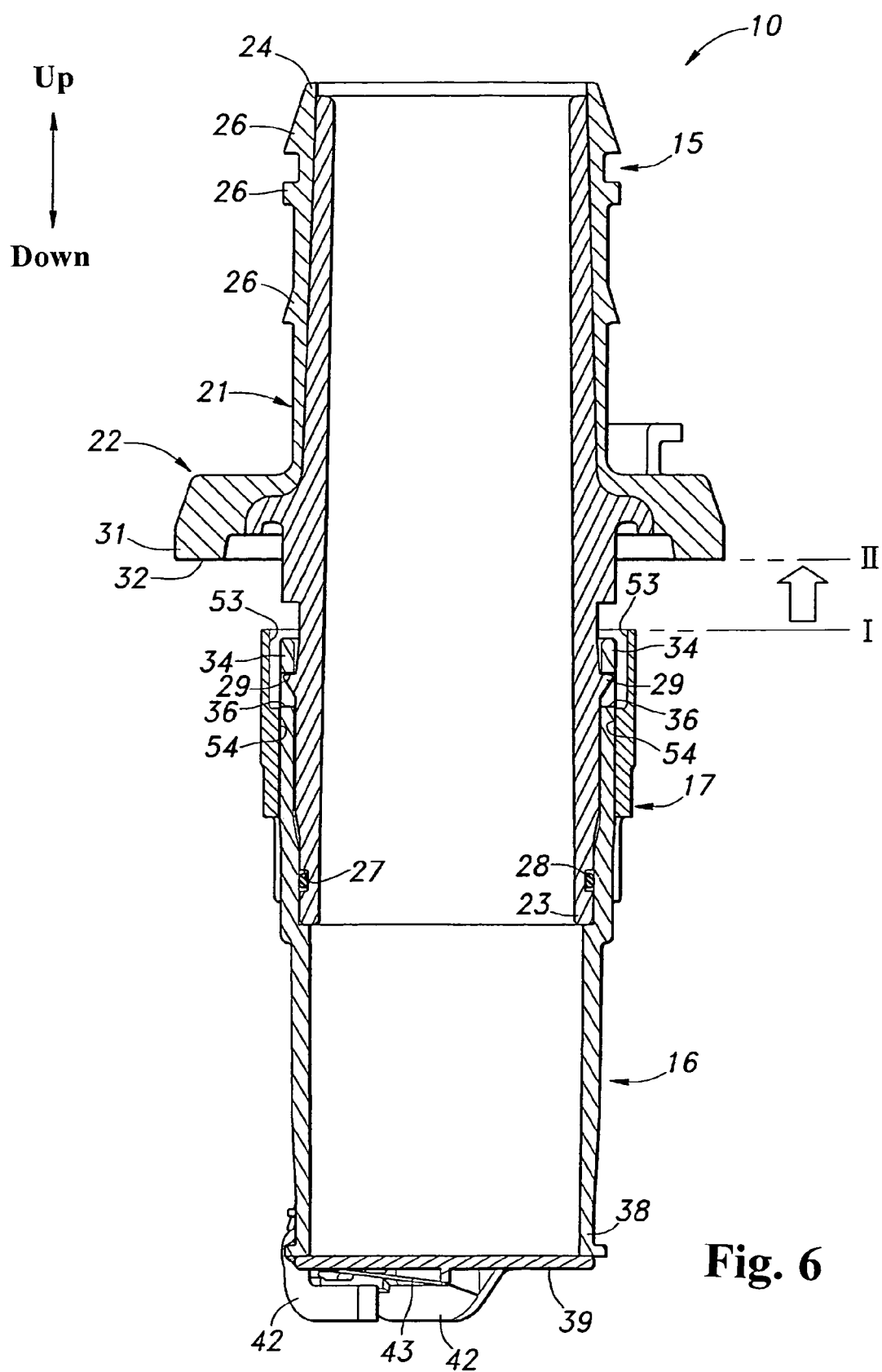
FIG. 6 is a cross-sectional view taken along a line VI-VI in FIG. 4, and is a drawing showing a state wherein the lock member is in the first position.
Figure 7:
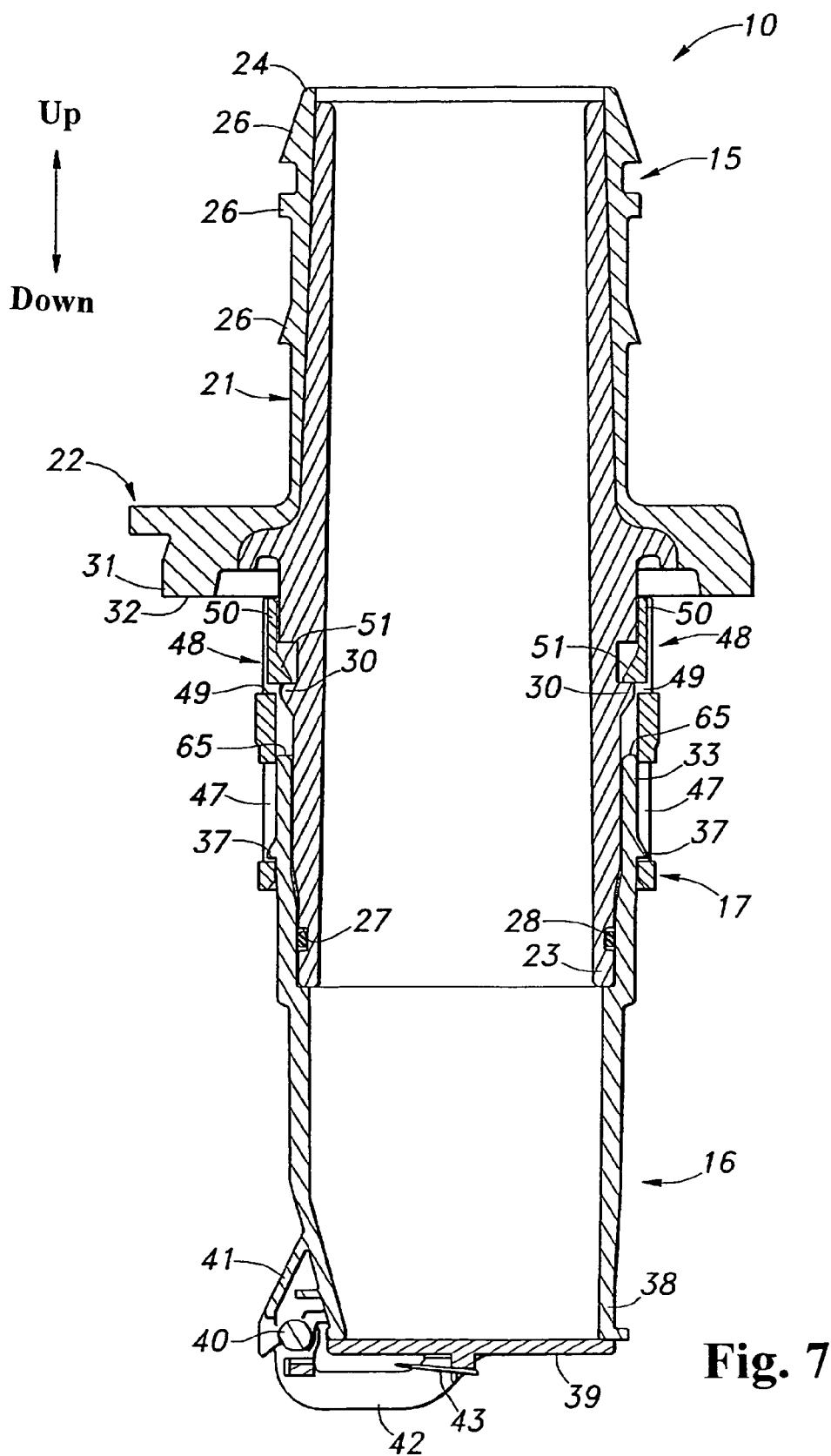
FIG. 7 is a cross-sectional view taken along a line VII-VII in FIG. 4, and is a drawing showing a state wherein the lock member is in a second position.

On the inner peripheral surface of the upper half portion of the lock member 17, and between each elastic claw 48, there are respectively formed escape grooves 53 which are concave grooves (see FIG. 6). Namely, four escape grooves 53 are formed with an interval of 90 degrees in a circumferential direction of the lock member 17. Each escape groove 53 continues to an upper end surface of the lock member 17. On a lower side of each escape groove 53, the inner peripheral surface of the lock member 17 is directly exposed, and this portion is a control wall 54.

Figure 5:
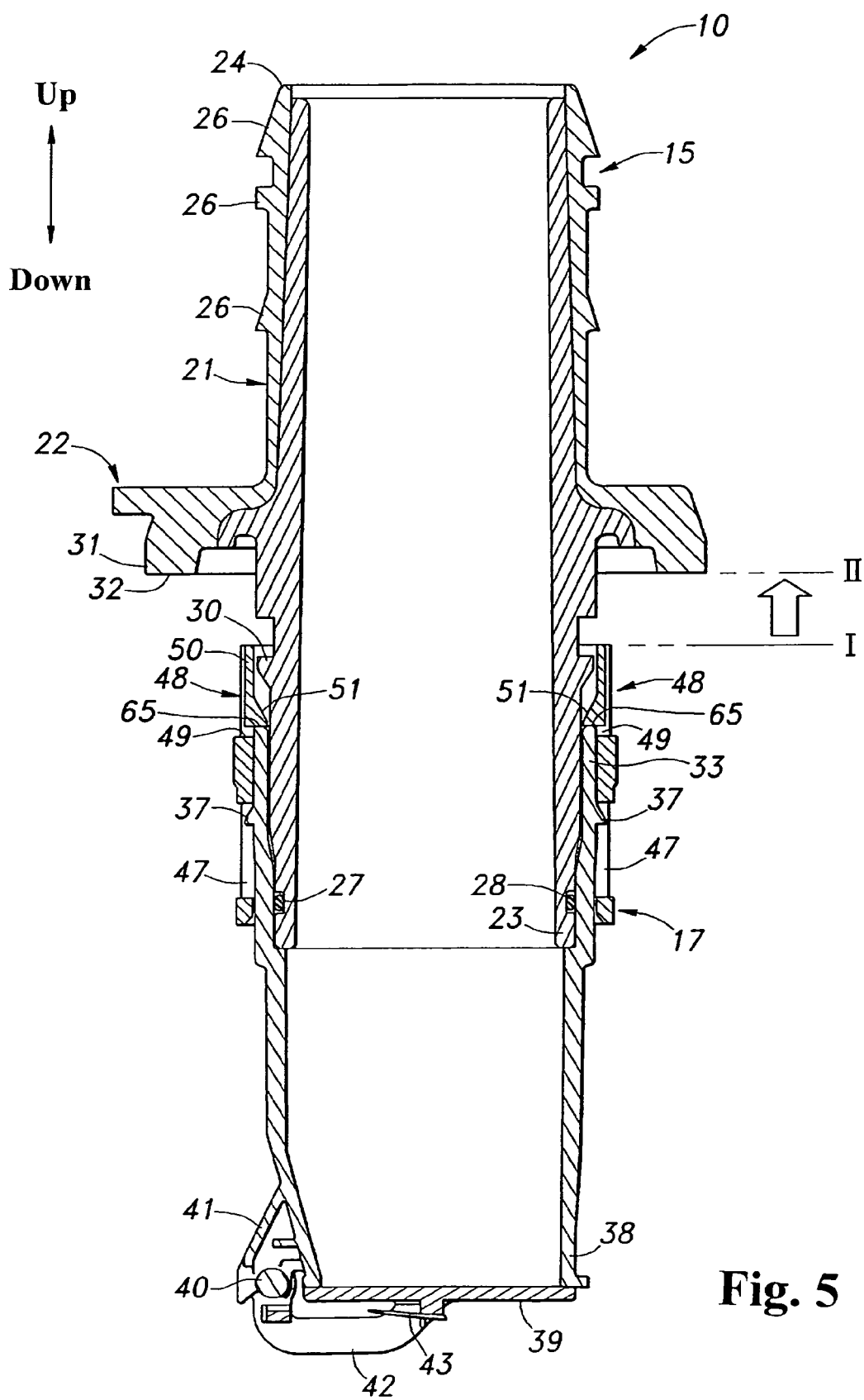
FIG. 5 is a cross-sectional view taken along a line V-V in FIG. 4, and is a drawing showing a state wherein a lock member is in the first position.

The lock member 17 is used in a state mounted on the connection end 33 of the connection pipe 16 beforehand (see FIG. 5). The mounting of the lock member 17 on the connection pipe 16 is carried out by inserting the connection end 33 of the connection pipe 16 into a lower end opening of the lock member 17. At that time, each guide convex portion 37 of the connection pipe 16 and each guide hole 47 of the lock member 17 correspond in the up-and-down direction. While each thin piece portion 45 of the lock member 17 is elastically deformed at the inclined surface of each guide convex portion 37, each guide convex portion 37 is disposed inside each guide hole 47. Each guide convex portion 37 is locked in each guide hole 47 to be capable of relatively moving in the up-and-down direction inside each guide hole 47, so that the lock member 17 is supported to be capable of being displaced in the top-and-down direction (the axis line direction of the connection pipe 16) relative to the connection pipe 16. When each guide convex portion 37 is positioned in an upper end inside each guide hole 47, a position relative to the connection pipe 16 of the lock member 17 is the first position (see FIGS. 5 and 6). When each guide convex portion 37 is positioned in a lower end inside each guide hole 47, a position relative to the connection pipe 16 of the lock member 17 is a second position (see FIGS. 7 and 8). In FIGS. 5 and 6, the first position is shown as I, and the second position is shown as II.

In the first position, a non-return surface of each elastic claw 48 of the lock member 17 abuts against the end surface 65 on the connection end 33 side of the connection pipe 16, so that a relative position relative to the connection pipe of the lock member 17 is controlled. Incidentally, the relative position relative to the connection pipe 16 of the lock member 17 may be controlled by abutting each guide convex portion 37 against an upside hole wall of each guide hole 47. In the second position, the control surface of each guide convex portion 37 abuts against a downside hole wall of each guide hole 47, so that the relative position relative to the connection pipe 16 of the lock member 17 is controlled.

Incidentally, the lateral end surface of each guide convex portion 37 abuts against right-and-left lateral walls (both lateral walls in the circumferential direction of the lock member) of each guide hole 47 so as to control a displacement (a rotation around the axis line of the connection pipe 16) in the circumferential direction relative to the connection pipe 16 of the lock member 17.

As shown in FIG. 6, when the lock member 17 is in the first position, each locking piece 34 of the connection pipe 16 faces the escape groove 53 of the lock member 17 in the radial direction of the connection pipe 16. Thereby, each locking piece 34 can tilt and fall into the escape groove 53.

Next, a connection procedure between the conduction pipe 15 and the connection pipe 16, and a connection structure will be explained. First, the lock member 17 is disposed in the first position, and the conduction pipe 15 and the connection pipe 16 are disposed coaxially in such a way that the inner end 23 of the conduction pipe 15 and the connection end 33 of the connection pipe 16 are facing each other. At that time, from a view in an axis line direction of the conduction pipe 15, the conduction pipe 15 and the connection pipe 16 are disposed in such a way that the first locking claw 29 of the conduction pipe 15 and the locking hole 36 of the connection pipe 16 are matched.

From that state, the inner end 23 of the conduction pipe 15 is inserted into the connection end 33 of the connection pipe 16, and each first locking claw 29 is locked in each locking hole 36 (see FIG. 6). At that time, the lock member 17 is in the first position, and each locking piece 34 is facing each escape groove 53, and is allowed to tilt and fall outwardly in the radial direction of the connection pipe 16, so that while each first locking claw 29 is pushing and rejecting each locking piece 34 outwardly in the radial direction, each first locking claw 29 reaches inside each locking hole 36. Also, at the same time, the second locking claw 30 of the conduction pipe 15 is disposed inside the void 35 formed between the locking pieces 34, and in an upper side than the claw portion 51 of the elastic claw 48 of the lock member 17 (see FIG. 5).

Next, the lock member 17 is displaced from the first position to the second position (see an arrow in FIGS. 5 and 6). At that time, while the claw portion 51 of the elastic claw 48 is tilting and falling outwardly in the radial direction of the lock member 17, the claw portion 51 of the elastic claw 48 climbs over the second locking claw 30 from a lower side to an upper side. Then, the non-return surface of the claw portion 51 of the elastic claw 48 and the non-return surface of the second locking claw 30 abut, so that the elastic claw 48 is locked in the second locking claw 30, and the lock member 17 is fixed in the second position (see FIG. 7).

Figure 8:
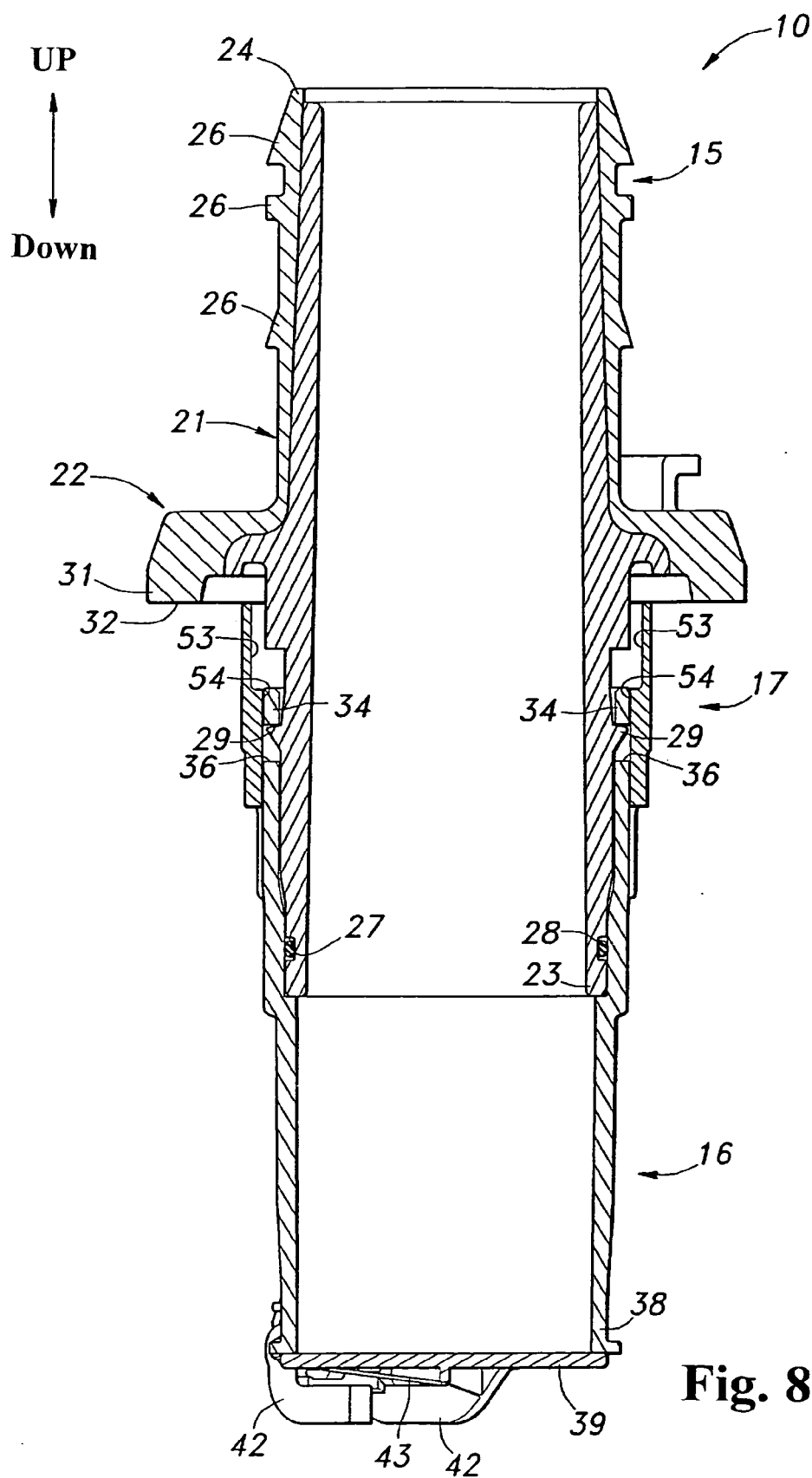
FIG. 8 is a cross-sectional view taken along a line VIII-VIII in FIG. 4, and is a drawing showing a state wherein the lock member is in the second position.

As shown in FIG. 8, the lock member 17 is displaced to the second position, so that each locking piece 34 of the connection pipe 16 stops facing each escape groove 53 of the lock member 17 and faces the control wall 54 of the inner peripheral surface of the lock member 17. Thereby, each locking piece 34 is prevented from tilting and falling, and an engagement state between each locking hole 36 and each first locking claw 29 is maintained.

In the above-mentioned plumbing structure 10, after the conduction pipe 15 and the connection pipe 16 are fitted, the lock member 17 supported in the connection pipe 16 is displaced in the axis line direction relative to the connection pipe 16 so as to be capable of maintaining a connected state between the conduction pipe 15 and the connection pipe 16. Each locking piece 34 is formed in the thin piece shape and has flexibility, so that when each first locking claw 29 and each locking hole 36 are engaged, each locking piece 34 easily tilts and falls. Consequently, when each first locking claw 29 and each locking hole 36 are engaged, the engagement state can be smoothly formed by a comparatively weak force. On the other hand, in a case wherein the lock member 17 is in the second position, each locking piece 34 is prevented from tilting and falling by being clamped between the outer peripheral surface of the connection pipe 16 and the inner peripheral surface of the lock member 17, so that each locking piece 34 can reliably maintain the engagement state with each first locking claw 29 even though each locking piece 34 has a flexibility.

The lock member 17 is annularly formed, so that even if the lock member 17 absorbs a fuel and swells, an annular shape is held (i.e., comparatively difficult to deform) so as to be capable of maintaining a state wherein each locking piece 34 is clamped between the connection pipe 16.

The lock member 17 is supported in the connection pipe 16 beforehand so as to be capable of being treated as an assembly, and there is no need for assembling the lock member 17 and the connection pipe 16 on a site connecting the conduction pipe 15 and the connection pipe 16 so as to be capable of reducing the number of processes of an assembly work. Also, a displacement direction of the lock member 17 relative to the connection pipe 16 is parallel to the axis line direction of the connection pipe 16 so as to correspond to a connection direction between the connection pipe 16 and the conduction pipe 15, and to facilitate a connection work. For example, a worker can form the connected state between the connection pipe 16 and the conduction pipe 15 only by pushing the connection end 33 of the connection pipe 16 into the inner end 23 of the conduction pipe 15 by gripping the lock member 17.

Thus, an explanation of a specific embodiment has been completed. However, the present invention is not limited to the aforementioned embodiment, and can be extensively transformed. For example, in the embodiment, the lock member 17 is slid and moved in parallel in the axis line direction of the connection pipe 16 from the first position to the second position. However, the lock member 17 may be rotated and moved around the axis line of the connection pipe 16. Also, the lock member 17 may be supported in the conduction pipe 15.

In the embodiment, although the connection pipe 16 is externally fitted into the conduction pipe 15, the connection pipe 16 may be internally fitted into the conduction pipe 15. Also, the first locking claw 29 and the second locking claw 30 may be provided in the connection pipe 16, and the locking piece 34 and the locking hole 36, and the guide convex portion 37 may be provided in the conduction pipe 15. Also, as long as the first locking claw 29 and the locking hole 36; the second locking claw 30 and the elastic claw 48; and the guide convex portion 37 and the guide hole 47 respectively have engagement relationships, a convex part and a concave part (a claw and a hole) may be inverted.

In the embodiment, although a flap valve is formed in the open end 38 of the connection pipe 16, instead of the above, various valve devices, filter devices, or the like may be formed as well. Also, a valve device may be formed inside the connection pipe 16.

EXPLANATION OF SYMBOLS

10 . . . a plumbing structure; 11 . . . a fuel tank; 12 . . . an upper wall portion; 13 . . . a through-hole; 14 . . . a fuel hose; 15 . . . a conduction pipe (a first pipe); 16 . . . a connection pipe (a second pipe); 17 . . . a lock member; 23 . . . an inner end; 24 . . . an outer end; 29 . . . first locking claws (locking portions); 30 . . . second locking claws (engagement portions); 33 . . . a connection end; 34 . . . locking pieces; 36 . . . locking holes; 37 . . . guide convex portions; 38 . . . an open end; 45 . . . thin piece portions; 47 . . . guide holes; 48 . . . elastic claws; 53 . . . escape grooves; 54 . . . a control wall; and 65 . . . an end surface

What is claimed is:

1. A fuel tank plumbing structure adapted to be inserted into a through-hole formed in a wall portion of a fuel tank, comprising:
    a first pipe adapted to be attached to the fuel tank such that an inner end thereof is disposed inside the fuel tank and an outer end thereof is disposed outside the fuel tank;
    a second pipe coaxially connected to the inner end of the first pipe, and communicating with the first pipe;
    a flexible locking piece protruding from one of the first pipe or the second pipe, and having a protruding end displaced in a radial direction of the one of the first pipe or the second pipe;
    a locking portion formed in another of the first pipe or the second pipe, and engaging the locking piece to communicate the first pipe and the second pipe; and
    a lock member annularly formed, and externally fitted onto an outer peripheral surface of the one of the first pipe or the second pipe, and including an escape groove portion formed on an inner peripheral surface thereof and a control wall portion arranged adjacent to the escape groove portion, the lock member being arranged to move in an axis line direction of the one of the first pipe or the second pipe between a first position wherein the locking piece is separated from the lock member and the protruding end of the locking piece is displaced toward the escape groove portion to engage or disengage the locking portion, and a second position wherein the locking piece abuts against the control wall portion to prevent the locking portion from disengaging from the locking piece, when the first pipe and the second pipe are communicated,
    wherein the escape groove portion is adjacent to the control wall portion in an axis line direction of the lock member, and the lock member is a member separate from the first pipe and the second pipe,
    the one of the first pipe or the second pipe includes a guide convex portion protruding outwardly from the outer peripheral surface thereof, and the lock member includes a piece portion protruding in the axis line direction of the lock member from one end portion thereof and having a guide hole formed therein to engage the guide convex portion; and
    in the first position, the guide convex portion is positioned in one end of the guide hole such that the locking piece faces the escape groove portion, and in the second position, the guide convex portion is positioned in another end of the guide hole such that the locking piece contacts the control wall portion.

2. A fuel tank plumbing structure according to claim 1, wherein the lock member comprises an elastic claw, and at least one of the first pipe or the second pipe includes an engagement portion engaging with the elastic claw when the lock member is positioned in the second position.

3. A fuel tank plumbing structure according to claim 2, wherein the elastic claw abuts against an end surface of the one of the first pipe or the second pipe supporting the lock member when the lock member is positioned in the first position.

4. A fuel tank plumbing structure according to claim 1, wherein one end portion of the another of the first pipe or the second pipe fits into one end portion of the one of the first pipe or the second pipe.

5. A fuel tank plumbing structure according to claim 1, wherein the another of the first pipe or the second pipe includes a locking claw protruding outwardly from an outer peripheral surface thereof, and the lock member includes an elastic claw arranged at another end portion thereof and having a non-return surface formed at one end thereof; and
    in the first position, the non-return surface contacts one surface of the one of the first pipe or the second pipe, and in the second position, the non-return surface is fixed in the locking claw to lock the lock member.

6. A fuel tank plumbing structure according to claim 5, wherein the escape groove portion is a concave groove formed on the inner peripheral surface of the lock member on the another end portion thereof, and the control wall portion is formed on the inner peripheral surface of the lock member on the one end portion thereof.

* * * * *